(12) United States Patent
Al-Mehthel et al.

(10) Patent No.: US 8,945,300 B2
(45) Date of Patent: Feb. 3, 2015

(54) UTILIZATION OF HEAVY OIL ASH TO PRODUCE HIGH QUALITY CONCRETE

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Abdulaziz S. Al-Utaibi, Dhahran (SA); Mohammed Maslehuddin, Dhahran (SA); Mohammed Rizwan Ali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/665,303

(22) Filed: Oct. 31, 2012

(65) Prior Publication Data

US 2013/0104779 A1   May 2, 2013

Related U.S. Application Data (60) Provisional application No. 61/553,585, filed on Oct. 31, 2011.

(51) Int. Cl.
*C04B 7/02* (2006.01)
*C04B 28/04* (2006.01)
*C04B 111/00* (2006.01)
*C04B 111/10* (2006.01)

(52) U.S. Cl.
CPC ....... *C04B 28/04* (2013.01); *C04B 2111/00767* (2013.01); *C04B 2111/10* (2013.01); *Y10S 106/01* (2013.01)
USPC ..................... 106/705; 106/DIG. 1

(58) Field of Classification Search
CPC .......................................................... C04B 7/02
USPC ............................................. 106/705, DIG. 1
See application file for complete search history.

(56) References Cited

U.S. PATENT DOCUMENTS

| | | | |
|---|---|---|---|
| 3,127,455 A | 3/1964 | Culbertson, Jr. | |
| 3,239,472 A | 3/1966 | De Lisle | |
| 4,240,952 A | 12/1980 | Hulbert, Jr. | |
| 5,108,510 A | 4/1992 | Bürge | |
| 5,336,317 A | 8/1994 | Beisswenger | |
| 7,462,310 B2 | 12/2008 | Ohono | |
| 7,485,184 B2 | 2/2009 | Hill | |
| 8,444,761 B2 * | 5/2013 | Al-Mehthel et al. | 106/281.1 |

(Continued)

FOREIGN PATENT DOCUMENTS

| | | | |
|---|---|---|---|
| KR | 2006104518 | * | 10/2006 |
| KR | 653311 B1 | * | 12/2006 |

OTHER PUBLICATIONS

KR 2006104518 A (Kang et al.) Oct. 9, 2006 abstract only.*

(Continued)

*Primary Examiner* — Paul Marcantoni
(74) *Attorney, Agent, or Firm* — Bracewell & Giuliani LLP; Constance G. Rhebergen (57) ABSTRACT

A concrete mixture that includes aggregates, water and cement can include heavy oil ash instead of or in addition to a portion of the cement. In one embodiment, the heavy oil ash originates from heavy fuel oil burned in a power generation plant. The weight of the heavy oil ash used in the concrete mixture can be from greater than 0 to about 10% of the weight of the cement.

19 Claims, 4 Drawing Sheets

(56) References Cited

U.S. PATENT DOCUMENTS

2006/0278131 A1  12/2006  Hunt
2013/0118382 A1* 5/2013  Al-Mehthel et al. .......... 106/705

OTHER PUBLICATIONS

English Translation of KR 653311 B1 (Dec. 1, 2006).*
KR 2006104518 Oct. 2006 Korean patent—Kang et al. Machine Translation into English.*
PCT Notification of Transmittal of the International Search Report and the Written Opinion of the International Searching Authority, or the Declaration; dated Feb. 12, 2013; International Application No. PCT/US2012/062691; International File Date: Oct. 31, 2012.
Thomson Scientific, Database WPI, XP002691073, Korea Inst Ceramic Eng. & Technology, Sep. 24, 2004.
Camilleri, J., Anastasi, M. and Torpiano, A., The Microstructure and Physical Properties of Heavy Oil Fuel Ash Replaced Portland Cement for use in Flowable Fill Concrete and the Production of Concrete Masonry Units, Construction and Building Materials, Jan. 1, 2013, pp. 970-979, vol. 38, Elsevier Ltd., www.elsevier.com/locate/conbuildmat.
Mofarrah, A., Husain, T. and Danish E.Y., Investigation of the Potential Use of Heavy Oil Fly Ash as Stabilized Fill Material for Construction, XP008159660,Journal of Material in Civil Engineering, Jun. 1, 2012, pp. 684-690, vol. 24 No. 6, American Society of Civil Engineers.
Paya, J., Borrachero, M.V., Monzo, J. and Bonilla, M., Properties of Portland Cement Mortars Incorporating High Amounts of Oil-Fuel Ashes, XP002691072, Waste Management, Feb. 1, 1999, pp. 1-7, vol. 19, Elsevier Science, Ltd.
Fly Ash in Concrete, Fly Ash Bricks Information, Jul. 20, 2011, pp. 1-7, internet website http://flybricksinfo.com/flyash-concrete.html.
Fly Ash Concrete: Inexpensive replacement for Portland cement, National Association of Home Builders Research Center, Jul. 20, 2011, pp. 1-3, internet website http://www.toolbase.org/Technology-Inventory/Foundations/fly-ash-concrete.
Cement Substitutes: By-products from other manufacturing or electric generating processes can be substituted for cement, National Association of Home Builders Research Center, Jul. 20, 2011, pp. 1-4, internet website http://www.toolbase.org/TechInventory/TechDetails.aspx?ContentDetailID=953&Bucketl . . . .

* cited by examiner

UTILIZATION OF HEAVY OIL ASH TO PRODUCE HIGH QUALITY CONCRETE

PRIORITY

This application claims priority to U.S. Provisional Patent Application No. 61/553,585 titled "Utilization of Heavy Oil Ash to Produce High Quality Concrete," filed on Oct. 31, 2011, the disclosure of which is incorporated herein by reference in its entirety.

BACKGROUND OF THE INVENTION

1. Field of the Invention

The present invention relates to a method and apparatus for producing high quality concrete utilizing heavy oil ash. More specifically, the invention relates to using heavy oil ash instead of, or in addition to, cement to produce high quality heavy oil ash Portland cement concrete.

2. Description of the Related Art

Conventional concrete can typically have Portland cement and water, plus any of a variety of aggregates, such as sand or gravel. Upon mixing, a "hydraulic reaction" occurs between the water and the cement, and the result is a cement paste that binds the aggregates together. High quality concrete can be produced by adding silica fume or fly ash as a partial replacement or as an addition to the Portland cement. The silica fume and fly ash can react with calcium hydroxide from the cement (pozzolanic reaction). The pozzolanic reaction can increase the strength and denseness of concrete after it cures. Unfortunately, these pozzolans are relatively expensive and, thus, increase the cost of the concrete.

SUMMARY OF THE INVENTION

In view of the foregoing, concrete mixtures that include heavy oil ash, and methods of preparing the heavy oil ash cement concrete mixtures, are provided as embodiments of the present invention. Oil Ash (OA) is a black powder type of waste material that results from burning oil in power generation plants.

In embodiments, OA is used as a partial replacement of or as an addition to, the cement to produce high quality OA-Portland cement concrete. The properties of OA cement concrete are better than those of ordinary Portland cement concrete. In embodiments, up to 5% OA can be used as a replacement of cement resulting in an increase to the 28-day compressive strength of concrete by 28% compared to concrete made with 100% ordinary Portland cement (OPC); up to 5% OA can be used as a replacement of cement resulting in a decrease of the 28-day concrete permeability to chloride by more than 50% compared to concrete made with 100% OPC; up to 10% OA can be used as an addition to concrete resulting in an increase to the 28-day compressive strength of concrete by approximately 25% and decrease to the 28-day concrete permeability to chloride by more than 50%, compared to concrete made with 100% OPC.

A significant quantity of OA is produced due to burning of heavy or cracked fuel oil in power generation plants. This quantity is expected to increase with further increases in the use of heavy or cracked oil. Therefore, it is desirable to use this byproduct as a useful material. The utilization of OA in construction materials would also find an outlet for this byproduct material, protect the environment and eliminate the need for building special areas to dispose of OA.

Presently, high quality concrete is produced with the use of silica fume or fly ash as pozzolanic materials. Both fly ash and silica fume are expensive. This invention will eliminate the need for using fly ash and silica fume to produce high quality concrete. Embodiments can reduce the required quantity of cement, thus decreasing the cost of resulting concrete, while also reducing the carbon foot print. Embodiments include a method of disposing of OA by using the GA to produce high quality concrete. Embodiments can reduce or eliminate the requirements for special disposal facilities for OA. Furthermore, the concrete produced with OA can have better quality than concrete produced using only ordinary Portland concrete ("OPC").

In embodiments, a heavy oil ash cement concrete can include aggregates, heavy oil ash fines, which can be made up of at least 90% carbon and at least 80% of the heavy oil ash fines can be finer than 45 micrometer (#325 sieve), wherein the heavy oil ash fines do not have cementitious properties, and do not react with lime. Embodiments can also include water and cement, the heavy oil ash cement concrete being the result of mixing of the water and cement in the presence of the heavy oil ash fines and aggregate. The heavy oil ash cement can have a cement matrix, that defines a plurality of pores, with the heavy oil ash fines filling at least a portion of the plurality of pores.

Presently, high quality concrete is produced with the use of silica fume or fly ash as pozzolanic materials. Both fly ash and silica fume are expensive. This invention will eliminate the need for using fly ash and silica fume to produce high quality concrete. Embodiments can reduce the required quantity of cement, thus decreasing the cost of resulting concrete, while also reducing the carbon foot print. Embodiments include a method of disposing of OA by using the OA to produce high quality concrete. Embodiments can reduce or eliminate the requirements for special disposal facilities for OA. Furthermore, the concrete produced with OA can have better quality than concrete produced using only ordinary Portland concrete ("OPC").

In embodiments, the cement can be Portland cement, and the proportion of water, Portland cement, heavy oil ash fines, and aggregates can be approximately 8 parts water, 20 parts cement, 1 part heavy oil ash fines, and preferably 99 parts aggregate. The heavy oil ash concrete can be free of fly ash and silica fume. The weight of the heavy oil ash fines can be about 5% to about 10% of the weight of the cement. In embodiments, the weight of the heavy oil ash fines can be at least about 5% of the weight of the cement. The compressive strength of the heavy oil ash cement concrete, after 28 days of curing, can be at least 68 MPa. In embodiments, at least 28 days after curing, a chloride permeability of the heavy oil ash cement concrete can be less than 2,000 Coulombs.

Embodiments of the invention can include a method of disposing of heavy oil ash. The method can include the steps of providing a predetermined quantity of a cement; providing a predetermined quantity of water, with the predetermined quantity of water being between about 35% and 50% the predetermined quantity of the cement. The method can also include the steps of preparing a predetermined quantity of heavy oil ash fines, the predetermined quantity of heavy oil ash fines having a weight up to about 10% by weight of a weight of the predetermined quantity of the binder, and the heavy oil ash fines having a carbon content greater than about 90%. The method can also include the steps of preparing a predetermined quantity of aggregate, and combining the cement, water, aggregate, and heavy oil ash such that the cement and water react to create the heavy oil ash cement concrete, the heavy oil ash cement having a cement matrix, the cement matrix defining a plurality of pores, and the heavy oil ash filling at least a portion of the plurality of pores.

In Embodiments, the cement can include Portland cement. In embodiments, the step of providing heavy oil ash fines can include burning a heavy fuel oil to produce the heavy oil ash fines. The ratio of water, cement, heavy oil ash fines, and aggregates can be approximately 8 parts water, 19 parts cement, 1 part heavy oil ash, and preferably 99 parts aggregates. In embodiments, the heavy oil ash fines do not react with lime. The heavy oil ash fines can include, by weight, about 5% to about 10% of the heavy oil ash cement concrete.

In embodiments of the heavy oil ash cement concrete, the heavy oil ash cement concrete can include water; Portland cement; aggregate; and heavy oil ash fines which can include heavy oil ash and be substantially free of fly ash and silica fume. The heavy oil ash can include at least 90% carbon and at least 80% of the heavy oil ash can be finer than 45 micrometer (#325 sieve). In embodiments, the heavy oil ash does not have cementitious properties and is not reactive with lime. In embodiments, the heavy oil ash cement concrete is the result of mixing the water and Portland cement in the presence of the heavy oil ash fines and aggregate. The heavy oil ash cement can have a cement matrix, which can define a plurality of pores and the heavy oil ash fines can fill at least a portion of the plurality of pores.

In embodiments, the weight of the heavy oil ash fines can equal at least 5% of the weight of the Portland cement. The water to Portland cement ratio can be approximately 0.4 and the weight of the heavy oil ash fines can equal approximately 5% to 10% of the weight of the Portland cement. The ratio of water, Portland cement, heavy oil ash, and aggregates can be approximately 8 parts water, 20 parts cement, 1 part heavy oil ash fines, and preferably 99 parts aggregate. In one embodiment, at least 28 days after curing, a chloride permeability of the oil ash concrete is less than 2000 coulombs.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE INVENTION

Heavy oil ash is a residue resulting from the combustion of heavy oil or cracked oil, Heavy oil is generally defined as fuel oil having relatively long hydrocarbon chains such as, for example, carbon lengths of between about 12-70 carbon atoms or between about 20-70 carbon atoms. Heavy fuel oil can be classified as "No. 5 fuel oil" or "No. 6 fuel oil" as classified by the American Society for Testing and Materials (ASTM). Due to its high viscosity, heavy fuel oil is sometimes preheated before combustion in, for example, a power generation plant.

Cracking, in the oil refining industry, generally refers to breaking down complex organic molecules into simpler molecules by breaking the long-chain hydrocarbons into shorter hydrocarbon chains. Various processes can be used to crack oil including, for example, catalytic processes. After the cracking process, the resultant hydrocarbons can be separated into various types of fuel, including, for example, fuel gas, liquefied petroleum gas ("LPG"), gasoline, light cycle oils, and heavy fuel oil. The heavy fuel oil produced by the cracking process can be referred to as "cracked fuel oil," For purposes of this application, cracked fuel oil and heavy fuel oil are both referred to as heavy fuel oil, unless otherwise specified. Electricity production plants can use heavy fuel oil and are expected to use increasing quantities of heavy fuel oil in the future. Combustion of heavy fuel oil produces residue, including ash. As one of ordinary skill will appreciate, the heavy oil ash can, and to some extent must, due to environmental restrictions, be captured rather than being released into the atmosphere.

Heavy oil ash ("HOA") is a black powder type of waste material that results from burning of heavy oil. Heavy oil ash has unique characteristics compared to other types of ash. Typically, heavy oil ash includes more than about 90% by weight carbon. The remaining less than about 10% by weight of the heavy oil ash can frequently include sulfur, magnesium, and vanadium. Heavy oil ash can include various particle sizes. In one embodiment, about 16% by weight of the heavy oil ash is retained on a #325 sieve, while about 84% by weight of the material passes through the #325 sieve. This indicates that about 84% by weight of the ash can be finer than about 45 micrometers. As used herein, the term "about" is understood to include values that are within 5% of the stated value.

Heavy oil ash can contain various elements, For example, Table 1 presents a typical chemical analysis of HOA. The amounts of each element can vary depending upon the source of the heavy oil fly ash. The HOA used in embodiments of the present invention can contain more than about 90 wt, % carbon because it is formed by burning heavy oils.

TABLE 1

| Elemental composition of one embodiment of HOA | |
|---|---|
| Element | Weight, % |
| Carbon | 92.5 |
| Magnesium | 0.79 |

TABLE 1-continued

Elemental composition of one embodiment of HOA

| Element | Weight, % |
|---|---|
| Silicon | 0.09 |
| Sulfur | 5.80 |
| Vanadium | 0.61 |

As can be seen in Table 1, the elemental composition of the HOA used in embodiments of the present invention is substantially different from that of traditional fly ash that has been previously used in concrete.

Unlike HOA, traditional fly ash is generally produced by burning coal. The main chemical components of the traditional fly ash are silicon dioxide ($SiO_2$), aluminum oxide ($Al_2O_3$), and iron oxide ($Fe_2O_3$) and it is in accordance with ASTM C618. Fly ash is generally categorized depending on the type of coal burned. For example, class F fly ash is produced by burning anthracite and bituminous coal, while Class C fly ash is produced by burning lignite or sub-bituminous coal.

Concrete is a composition made from cement, water, and aggregate or aggregates. While "aggregate" can be plural, the term "aggregates" generally refers to more than one type or more than one size of aggregate. Cement is a binder that can bind the aggregates together. Ordinary Portland cement ("OPC") is one such binder that can bind to other materials, such as fine and coarse aggregates, thereby holding them together. A material that is a paste that can harden to bind materials together, in the manner of cement, is said to be a cementitious material or to have cementitious properties. One of skill in the art will appreciate that water can be added to dry cement to make cement paste. The water-cement ratio ("w/c ratio") of OPC is typically between about 0.25 and 0.5. By way of explanation, a w/c ratio of 0.25 indicates that there is one part water to four parts Portland cement (¼=0.25). A w/c ratio of 0.5 indicates one part water to two parts cement.

As one of ordinary skill will appreciate, various types of conventional aggregates can be used as a filler in the concrete. As one of skill in the art will appreciate, the term "aggregates" can refer to aggregate of multiple types or sizes. Aggregate can include, for example, sand, gravel, crushed rock, slag, or any other type of aggregate. When aggregate is used in concrete, the cement generally coats the aggregates and then binds them together in a matrix. When aggregates of various sizes are used, the smaller aggregate materials can fill voids between the larger aggregate materials, thus creating a more dense matrix. The aggregates used in concrete can be defined in terms of coarse aggregate and fine aggregate. Fine aggregates, also referred to as "fines," can include natural sand, crushed stone, or other suitable fine particles, with most particles smaller than 5 mm. Coarse aggregates generally include gravel or crushed stone with particles predominantly larger than 5 mm and typically between 9.5 mm and 37.5 mm.

A pozzolan is a finely divided siliceous or siliceous and aluminous material that reacts chemically with slaked lime (calcium hydroxide) at ordinary temperature and in the presence of moisture to form a calcium silicate hydrate or other cementitious compounds. A material that has such pozzolanic properties is considered a pozzolan. Fly ash is a pozzolan. When fly ash is used in concrete, in conjunction with Portland cement, it can contribute to the properties of the hardened concrete through hydraulic or pozzolanic activity, or both. Therefore, fly ash can be used in concrete as an additive or partial replacement of cement.

When cement is mixed with water, chemical reactions cause the cement to crystallize and the crystals interlock the aggregates thereby giving strength to concrete. During this reaction, lime (calcium hydroxide) can become available within the concrete. It is this lime that can react with fly ash to give concrete increased strength. Over time, lime in the cement reacts with fly ash to fill the pores in the concrete and to further bind the concrete. The strength of concrete is often measured at 28 days because of the additional strength developed over the first 28 days as the fly ash reacts with the lime.

The standards controlling fly ash for use as a pozzolanic material are defined by ASTM C618. In particular, the carbon content, measured by the loss on ignition ("LOI") should be less than 6% or 4%, depending on the governing body. Because of the pozzolanic properties, it is common to make concrete wherein 30% or more of the Portland cement is replaced with fly ash. Similarly, silica fume, also having pozzolanic properties, can be used as a cement binder in concrete.

In contrast to the foregoing uses of fly ash in concrete, concrete mixtures that include heavy oil ash are provided as embodiments of the present invention. In embodiments of the present invention, the heavy oil ash contains more than about 90 wt. % carbon. In an aspect, the heavy oil ash does not have cementitious or pozzolanic properties. Indeed, the HOA generally does not react with calcium hydroxide, or lime. In embodiments, the LOI of HOA is greater than 60%. In embodiments, the LOI of HOA is greater than 75%. In embodiments, the LOI of HOA is greater than 85%. In some embodiments, no processing of the HOA is required prior to using it in the HOA cement concrete. In some embodiments, no processing to reduce the carbon content is required or used.

In various embodiments, the concrete of the present invention can include cement, water, heavy oil ash, and aggregates to create "heavy oil ash cement concrete" or HOA cement concrete. In one embodiment, voids, gaps, or pores (collectively referred to as "pores") can exist within the concrete matrix, and substantially all or at least a portion of the pores can be filled with HOA fines. In some embodiments, fly ash or silica fume is not used in the HOA cement concrete. In other embodiments, the HOA cement concrete is substantially free of fly ash and silica fume.

In one embodiment, up to 10% by weight of the Portland cement can be replaced with heavy oil ash. The compressive strength of the HOA cement concrete can be greater than the compressive strength of OPC concrete. Up to 10% HOA can be used as replacement of cement. In some embodiments, for example, about 7% of the cement is replaced with HOA. In one embodiment wherein 5% of the Portland cement is replaced by HOA, the compressive strength of the HOA cement concrete is about 30% greater than the compressive strength of OPC concrete. In one embodiment wherein 5% of the Portland cement was replaced with HOA, the compressive strength of the HOA concrete was at least 68 MPa. Furthermore, in this embodiment, the 28 day concrete permeability to chloride is decreased by more than 50%. Indeed, in one embodiment, the chloride permeability of the HOA concrete, 28 days after curing, can be less than 2000 coulombs.

One embodiment is based on concrete having 2 parts water and 5 parts cement, thus having a w/c ratio of 0.4. In this embodiment, however, approximately 5% of the cement is replaced with HOA. Due to the replacement, the composition of the mixture is approximately 8 parts water, 19 parts cement, and 1 part HOA. The w/c of this embodiment is, thus, 0.421. Similarly, in some embodiments, the w/c ratio is approximately 0.42 to 0.44. In some embodiments, the w/c ratio can be approximately 0.4 to 0.44. In some embodiments, the amount of water in the mixture can be between about 35% and 50% of the amount of cement. In some embodiments, the weight of the HOA can equal approximately 5-10% of the weight of the Portland cement. Embodiments can have about 1 to about 99 parts aggregates. A preferred embodiment can have about 99 parts aggregates.

In one embodiment, heavy oil ash can be added to Portland cement concrete mixture, wherein the amount of HOA is equal to or up to 10% of the weight of the Portland cement. In this embodiment, wherein HOA equal to 10% of the weight of the Portland cement, is added to the concrete mixture, the compressive strength of the HOA concrete, after it cures, is about 25% greater than the compressive strength of OPC concrete. Furthermore, in this embodiment, the 28 day concrete permeability to chloride is decreased by more than 50%.

In an alternate embodiment, a concrete mixture having a composition that includes approximately 8 parts water, 20 parts cement, and 1 part HOA is provided, thus having a we ratio of about 0.4, The composition can include HOA that has been added in an amount up to about 10% by weight of the cement, for example OPC, or in certain embodiments between about 5% and 10% by weight of the cement. Embodiments can have about 1 to about 99 parts aggregates. A preferred embodiment can have about 99 parts aggregates.

EXAMPLES

Table 2 shows the cement, water, and heavy oil ash mixtures of various exemplary embodiments. In embodiments defined as "Replacement," the defined percentage of BOA is used to replace the same amount, by weight, of Portland cement. Because that percentage of Portland cement has been removed, the w/c ratio is increased. In embodiments defined as "Addition," the HOA is added to the mixture and, thus, the w/e ratio is not changed.

TABLE 2

| Mix designation | % of HOA (Replaced/Added) | w/c Ratio | Cement content, kg/m³ |
|---|---|---|---|
| 0%-HOA | 0%-HOA-Replacement | 0.4 | 370 |
| 5%-HOA | 5%-HOA-Replacement | 0.421 | 370 |
| 7%-HOA | 7%-HOA-Replacement | 0.43 | 370 |
| 10%-HOA | 10%-HOA-Replacement | 0.44 | 370 |
| 5%-HOA | 5%-HOA-Addition | 0.4 | 370 |
| 7%-HOA | 7%-HOA-Addition | 0.4 | 370 |
| 10%-HOA | 10%-HOA-Addition | 0.4 | 370 |

Figure 1:
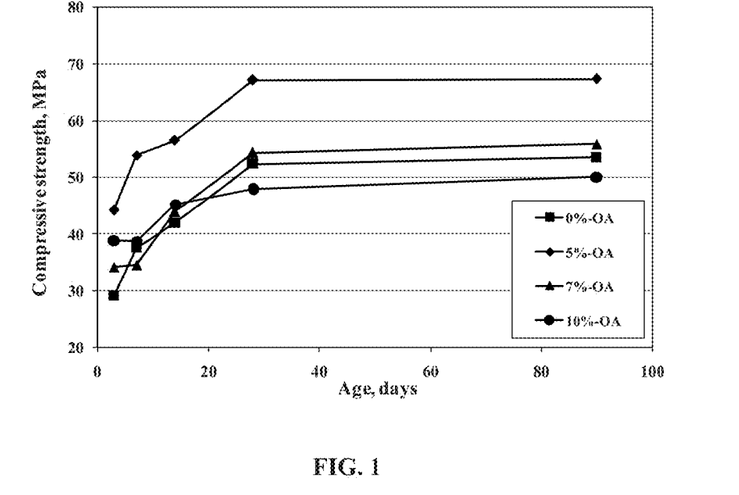
FIG. 1 is a graph showing the compressive strength development in various embodiments of heavy oil ash concrete having heavy oil ash ("HOA") used as a replacement of a portion of cement.
Figure 2:
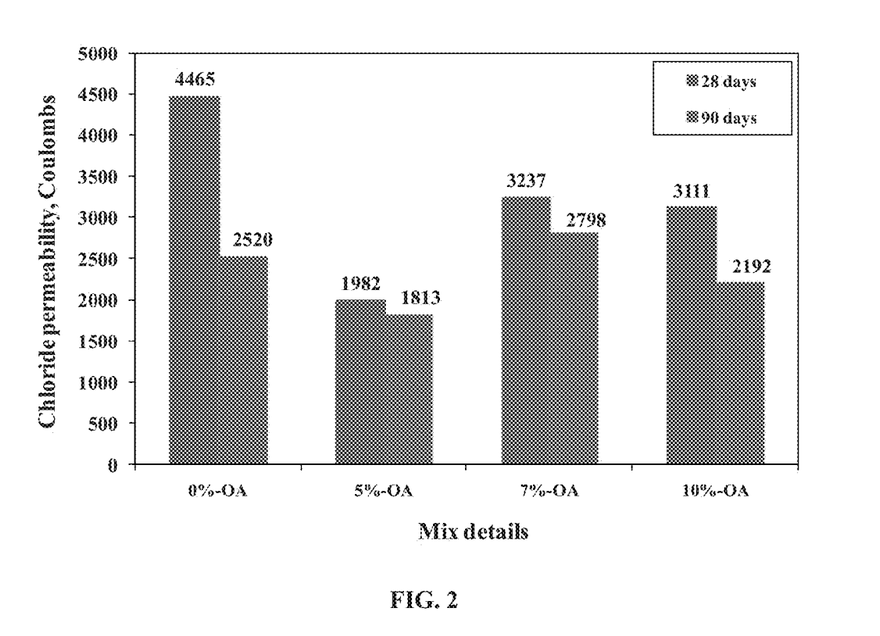
FIG. 2 is a graph showing chloride permeability in various embodiments of heavy oil ash concrete having HOA used as a replacement of a portion of cement.
Figure 3:
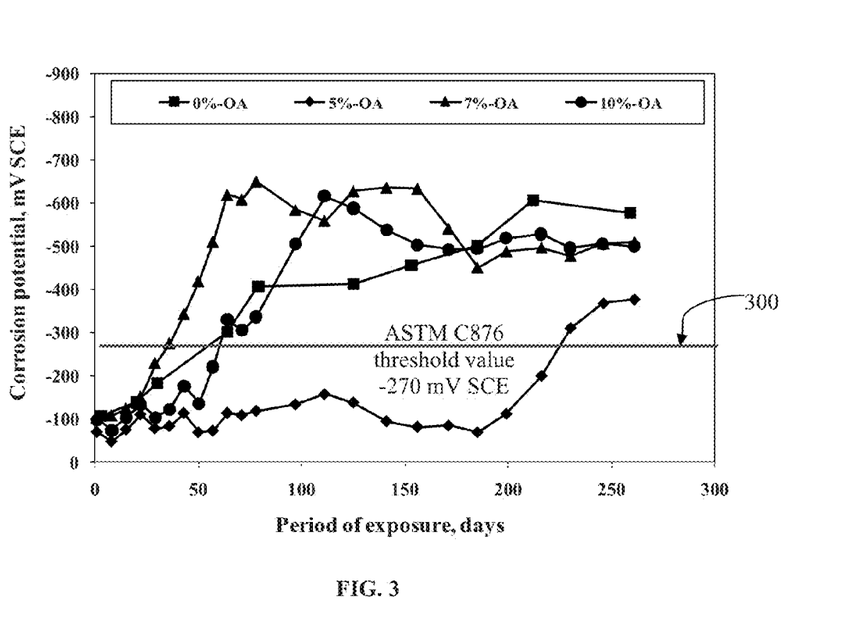
FIG. 3 is a graph showing corrosion potentials in various embodiments of heavy oil ash concrete having HOA used as a replacement of a portion of cement.

The compressive strength development in the HOA cement concrete specimens prepared with varying proportions of HOA, as a replacement of cement, is depicted in FIG. 1. The compressive strength increased with age in all the specimens. In some embodiments, maximum compressive strength was noted in the concrete specimens prepared with 5% HOA, as a replacement of cement, while the minimum compressive strength was noted in the concrete specimens prepared with 10% HOA. The compressive strength of 0% BOA and 7% BOA was almost similar. The compressive strength of 0, 5, 7, and 10% HOA cement concrete specimens, after 90 days of curing, was 54, 68, 56, and 50 MPa, respectively.

Table 2 shows the cement, water, and heavy oil ash mixtures of various exemplary embodiments. In embodiments defined as "Replacement," the defined percentage of HOA is used to replace the same amount, by weight, of Portland cement. Because that percentage of Portland cement has been removed, the w/c ratio is increased. In embodiments defined as "Addition," the HOA is added to the mixture and, thus, the w/e ratio is not changed.

The compressive strength development in the HOA cement concrete specimens prepared with varying proportions of HOA, as a replacement of cement, is depicted in FIG. 1. The compressive strength increased with age in all the specimens. In some embodiments, maximum compressive strength was noted in the concrete specimens prepared with 5% HOA, as a replacement of cement, while the minimum compressive strength was noted in the concrete specimens prepared with 10% HOA. The compressive strength of 0% HOA and 7% HOA was almost similar. The compressive strength of 0, 5, 7, and 10% HOA cement concrete specimens, after 90 days of curing, was 54, 68, 56, and 50 MPa, respectively.

Figure 4:
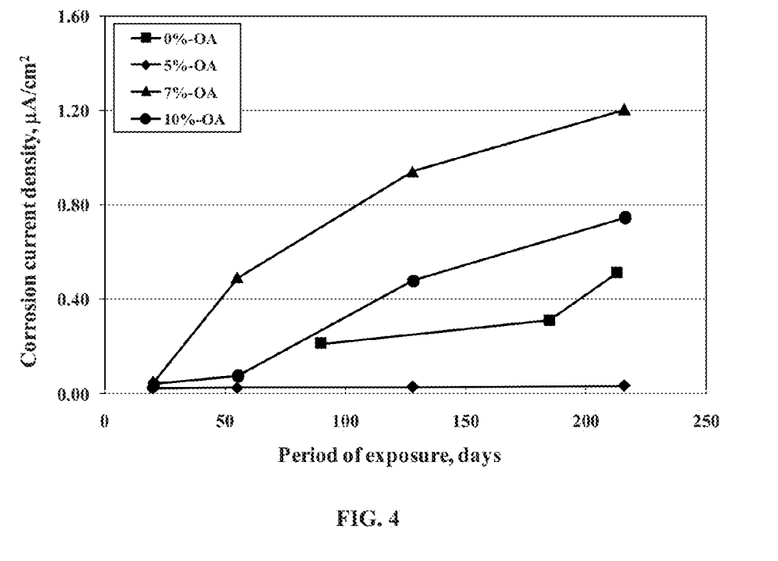
FIG. 4 is a graph showing corrosion current density on steel in various embodiments of heavy oil ash concrete having HOA used as a replacement of a portion of cement.

FIG. 4 depicts the corrosion current density on steel in the HOA cement concrete specimens prepared with various percentages of HOA as a replacement of cement. The corrosion current density was the minimum in the concrete specimens prepared with 5% HOA.

The data in FIGS. 1 through 4 indicate that the compressive strength and durability characteristics of 5% HOA, used as a replacement of cement, were better than those of control and other concrete specimens.

Evaluation of HOA as an Addition to Concrete

Figure 5:
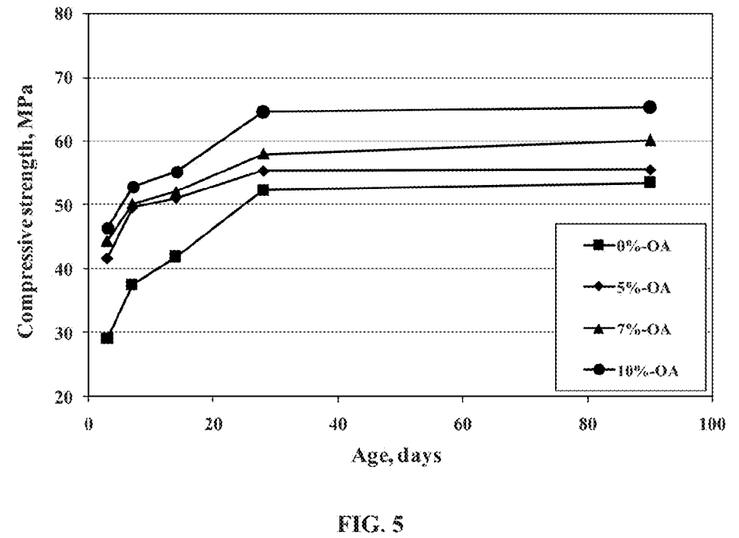
FIG. 5 is a graph showing compressive strength development in various embodiments of heavy oil ash concrete having HOA used as an addition to the concrete.

The compressive strength development in HOA cement concrete specimens prepared with various percentages of additional HOA, added as an addition to concrete, is plotted in FIG. 5. The compressive strength increased with age in all the concrete specimens. Further, the compressive strength increased with an increase in the HOA content in the concrete. After 90 days of curing, the compressive strength of concrete specimens with 0, 5, 7, and 10% HOA was 54, 56, 60, and 65 MPa, respectively. The increased compressive strength of concrete specimens prepared with HOA can be attributed to the filler effect of this material.

Figure 6:
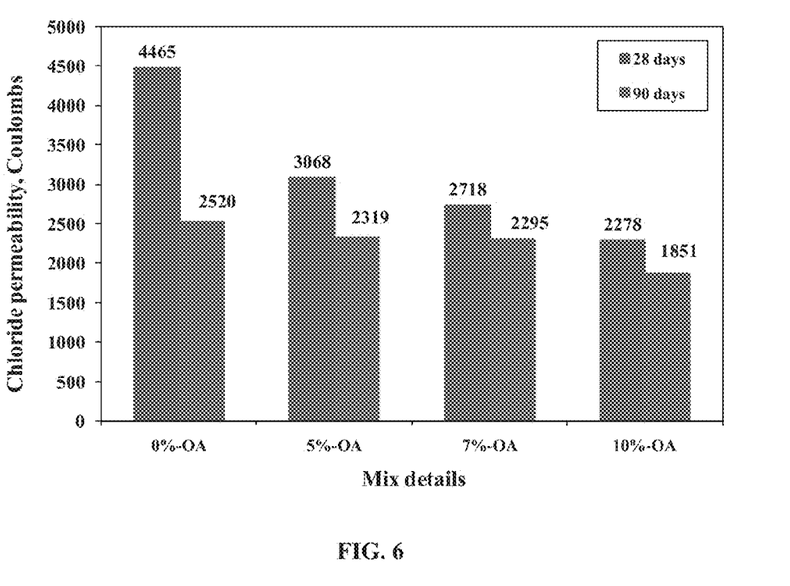
FIG. 6 is a graph showing chloride permeability in various embodiments of heavy oil ash concrete having HOA used as an addition to the concrete.

The chloride permeability in the HOA cement concrete specimens prepared with varying additional quantities of HOA, as an addition to concrete, is shown in FIG. 6. Maximum chloride permeability was noted in the concrete specimens prepared without any HOA. The chloride permeability generally decreased with increasing quantity of HOA. A more or less similar pattern was noted in the concrete specimens cured for 90 days.

Figure 7:
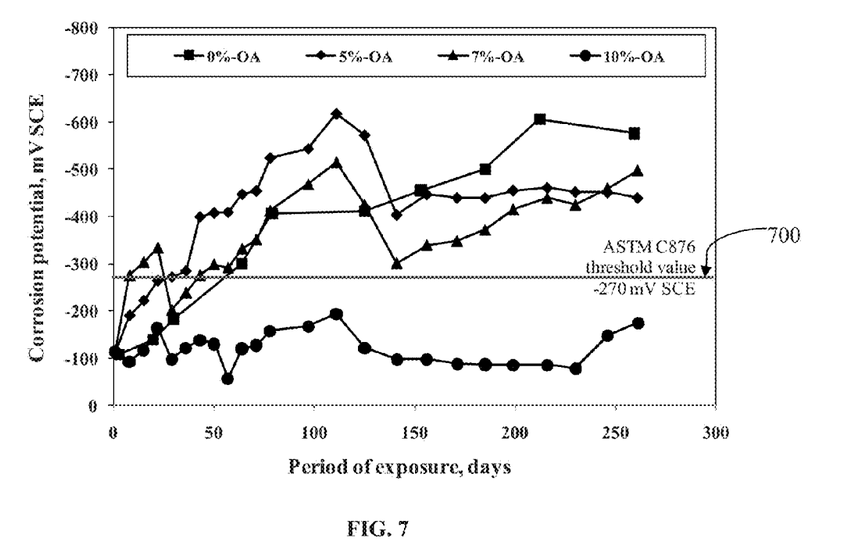
FIG. 7 is a graph showing corrosion potentials in various embodiments of heavy oil ash concrete having HOA used as an addition to the concrete.

The corrosion potentials on steel in the HOA cement concrete specimens prepared with varying additional quantities of HOA, as an addition to concrete, are depicted in FIG. 7. The potentials generally tended to increase (became more negative) with time and decreased. (became less negative) increasing quantity of HOA. The horizontal line 700 represents the ASTM C876 threshold value, which is −270 mV SCE.

Figure 8:
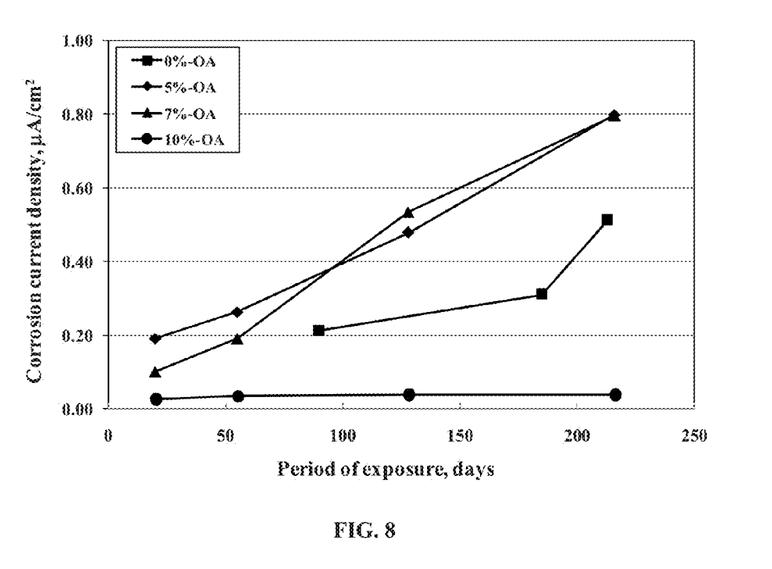
FIG. 8 is a graph showing corrosion current density on steel in various embodiments of heavy oil ash concrete having HOA used as an addition to the concrete.

The corrosion current density on steel in the HOA cement concrete specimens prepared with varying additional quantity of HOA, as an addition to concrete, is plotted in FIG. 8. The corrosion current density on steel in 10% HOA cement concrete was very low compared to that in the other cement concrete specimens.

As shown in Table 3, the results in FIGS. 5 through 8 indicate that the mechanical properties and durability characteristics of concrete specimens prepared with HOA as an addition were better than the control mixes. Further, both the strength and durability increased with increasing quantity of HOA.

TABLE 3

Comparison between concrete made with HOA, and OPC

| | Cement replacement/ Addition, % | 28-Day compressive strength, MPa | Chloride permeability, Columbus |
|---|---|---|---|
| OPC | 0 | 52 | 4465 |
| HOA-5% Replacement | 5 | 68 | 1982 |
| HOA-10% Addition | 10 | 65 | 2278 |

The concentration of heavy metals leached from the HOA cement concrete are shown in Table 4. All the heavy metals are within the allowable limits.

TABLE 4

Concentration of metals in HOA cement concrete

| Element | 5% HOA, mg/kg | 7% HOA, mg/kg | 10% HOA, mg/kg | Allowable limits, mg/kg |
|---|---|---|---|---|
| Ag | <0.015 | <0.015 | <0.015 | 5.0 |
| As | <0.055 | <0.055 | 0.055 | 5.0 |
| Ba | 0.757 | 0.433 | 0.474 | 100.0 |
| Cd | <0.003 | <0.003 | <0.003 | 1.0 |
| Co | <0.01 | <0.01 | <0.01 | — |
| Cr | 0.146 | 0.057 | 0.084 | 5.0 |
| Fe | 0.012 | 0.012 | 0.014 | — |
| Hg | <0.025 | <0.025 | <0.025 | 0.2 |
| Ni | <0.020 | <0.020 | <0.020 | 7.0 |
| Pb | <0.040 | <0.040 | <0.040 | 5.0 |
| Se | <0.090 | <0.090 | <0.090 | 1.0 |
| V | 0.060 | 0.390 | 0.140 | — |
| Zn | 0.033 | 0.025 | 0.025 | — |

The above results indicate that 5% replacement of cement with HOA or up to 10% addition of HOA to concrete is helpful in producing high quality concrete.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A heavy oil ash cement concrete, comprising:
an aggregate having cementitious properties, reactivity with lime or both;
heavy oil ash fines comprising at least 90% carbon and at least 80% of the heavy oil ash fines being finer than 45 micrometer (#325 sieve), where heavy oil ash fines do not have cementitious properties and do not react with lime;
water, and
a Portland cement,
where the heavy oil ash cement concrete is the result of the mixing of the water and cement in the presence of heavy oil ash fines and the aggregate, the heavy oil ash cement has a cement matrix, the cement matrix defines a plurality of pores, and the heavy oil ash fines fill at least a portion at the plurality of pores.

2. The heavy oil ash cement concrete of claim 1, where the cement comprises Portland cement, and the proportion of water, Portland cement, heavy oil ash fines, and aggregate is approximately 8 parts water, 19 parts cement, 1 part heavy oil ash fines, and about 99 parts aggregate, where all parts are by weight.

3. The heavy oil ash cement concrete of claim 1, wherein the cement comprises Portland cement and the water to Portland cement ratio is approximately 0.4 to 0.44 and wherein the weight of the heavy oil ash fines equals approximately 5% to 10% of the weight of the Portland cement.

4. The heavy oil ash cement concrete of claim 1, wherein the cement comprises Portland cement and the proportion of water, Portland cement, heavy oil ash fines, and aggregate is approximately 8 parts water, 20 parts cement, 2 parts heavy oil ash fines, and about 99 parts aggregate, where all parts are by weight.

5. The heavy oil ash cement concrete of claim 1, wherein the heavy oil ash concrete is free of fly ash and silica fume.

6. The heavy oil ash cement concrete of claim 1, wherein the weight of the heavy oil ash fines is about 5% to about 10% of the weight of the cement.

7. The oil ash concrete of claim 1, wherein the weight of the heavy oil ash fines is at least about 5% of weight of the cement.

8. The heavy oil ash cement concrete of claim 1, wherein the compressive strength of the heavy oil ash cement concrete, after 28 days of curing, is at least 68 MPa.

9. The heavy oil ash cement concrete of claim 1, wherein, at least 28 days after curing, a chloride permeability of the heavy oil ash cement concrete is less than 2,000 Coulombs.

10. A heavy oil ash cement concrete, the heavy oil ash cement concrete comprising;
water;
a Portland cement;
an aggregate having cementitious properties, reactivity with lime or both; and heavy oil ash fines comprising a heavy oil ash and being free of fly ash and silica fume, the heavy oil ash comprising at least 90% carbon and at least 80% of the heavy oil ash being finer than 45 micrometer (#325 sieve), the heavy oil ash not having cementitious properties and not being reactive with lime;
where the heavy oil ash cement concrete is the result of the mixing of the water and the Portland cement in the presence of heavy oil ash fines and the aggregate, the heavy oil ash cement having a cement matrix, the cement matrix defining a plurality of pores, and heavy oil ash fines filling at least a portion of the plurality of pores.

11. The heavy oil ash cement concrete of claim 10, wherein the weight of the heavy oil ash fines equals at least 5% of the weight of the Portland cement.

12. The heavy oil ash cement concrete of claim 10, wherein the water to Portland cement ratio is approximately 0.4 and wherein the weight of the heavy oil ash fines equals approximately 5% to 10% of the weight of the Portland cement.

13. The heavy oil ash cement concrete of claim 10, wherein the ratio of water, Portland cement, heavy oil ash, and aggregates is approximately 8 parts water, 20 parts cement, 1 part heavy oil ash fines, and about 99 parts aggregate, where all parts are by weight.

14. The oil ash concrete of claim 10, wherein, at least 28 days after curing, a chloride permeability of the oil ash concrete is less than 2000 coulombs.

15. The heavy oil ash cement concrete of claim 1 where the aggregate comprises a fine aggregate and a coarse aggregate.

16. The heavy oil ash cement concrete of claim 1 where the aggregate is selected from the group consisting of natural sand, crushed stone, gravel and crushed stone.

17. The heavy oil ash cement concrete of claim 1 where the aggregate comprises a pozzolan.

18. The heavy oil ash cement concrete of Claim 1 where the pozzolan is fly ash.

19. The heavy oil ash cement concrete of claim 1 where the heavy oil ash fines have a combined compositional content of magnesium, silicon and vanadium of less than 1.5 wt. % of the heavy oil ash fines.

* * * * *

UNITED STATES PATENT AND TRADEMARK OFFICE
CERTIFICATE OF CORRECTION

PATENT NO. : 8,945,300 B2
APPLICATION NO. : 13/665303
DATED : February 3, 2015
INVENTOR(S) : Mohammed Al-Mehthel et al.

Page 1 of 1

It is certified that error appears in the above-identified patent and that said Letters Patent is hereby corrected as shown below:

On the Title page, Item (73) Assignee, after Saudi Arabian Oil Company insert

--King Fahd University of Petroleum and Minerals, Dhahran (SA)--

Signed and Sealed this
Sixteenth Day of August, 2016

Michelle K. Lee
*Director of the United States Patent and Trademark Office*